(12) United States Patent
Alriksson et al.

(10) Patent No.: US 7,113,536 B2
(45) Date of Patent: Sep. 26, 2006

(54) RENDEZVOUS POINT INTERPICONET SCHEDULING

(75) Inventors: Fredrik Alriksson, Johanneshov (SE); Niklas Johansson, Järfälla (SE); Ulf Jönsson, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1081 days.

(21) Appl. No.: 09/834,911

(22) Filed: Apr. 16, 2001

(65) Prior Publication Data

US 2002/0150145 A1  Oct. 17, 2002

(51) Int. Cl.
*H04B 1/713* (2006.01)

(52) U.S. Cl. ............... 375/132; 370/230; 370/329; 709/209; 709/223

(58) Field of Classification Search ........... 375/132, 375/133, 222, 340; 370/328, 338, 401, 312, 370/230, 329, 351; 455/519, 426.1; 709/209, 709/223
See application file for complete search history.

(56) References Cited

U.S. PATENT DOCUMENTS

| | | | |
|---|---|---|---|
| 6,026,297 A | | 2/2000 | Haartsen |
| 6,594,703 B1 * | | 7/2003 | Li ................ 709/235 |
| 6,771,593 B1 * | | 8/2004 | Popovich ............ 370/218 |
| 6,785,254 B1 * | | 8/2004 | Korus et al. ......... 370/338 |
| 6,829,288 B1 * | | 12/2004 | Orava ................. 375/132 |
| 2002/0067724 A1 * | | 6/2002 | Helm et al. ......... 370/390 |
| 2003/0076842 A1 | | 4/2003 | Johansson et al. |

OTHER PUBLICATIONS

European Search Report dated Nov. 28, 2001.
"Welcome to Bluetooth Newbies", Aug. 2000 Edition, downloaded from http://www.bluetooth-developer.com/newbies.html; http://www.bluetooth-developer.com/newbies2.html; http://www.bluetooth-developer.com/newbies3.html; http://www.bluetooth-developer.com/newbies4.html; http://www.bluetooth-developer.com/newbies5.html; and http://www.bluetooth-developer.com/newbies6.html.

* cited by examiner

*Primary Examiner*—Kevin Burd
*Assistant Examiner*—Ted M. Wang
(74) *Attorney, Agent, or Firm*—Potomac Patent Group PLLC

(57) ABSTRACT

Apparatus and methods for providing Rendezvous point Interpiconet Scheduling (RIPS) in an ad hoc polling based communication infrastructure such as a Bluetooth system in which a PMP node (Participant in Multiple Piconet nodes) belongs to more than one piconet. The rendezvous (RV) points of a PMP node is defined based on information specific to the node, rather than being associated with the links between slave and master nodes. By defining RV points per PMP node rather than per link, the master node of a piconet in the RIPS system is aware of the RV points that its slave PMP nodes have in other piconets. This advantageously allows a master node in the RIPS system to know when its slave nodes will be present in the piconet and when they will not be present.

23 Claims, 10 Drawing Sheets

RV POINTS DEFINED PER LINK

RV POINTS DEFINED PER NODE

DELAY BETWEEN RV POINT AND CORRESPONDING TIMEWINDOW

CORRESPONDING TIMEWINDOW STARTS AFTER NEXT RV POINT

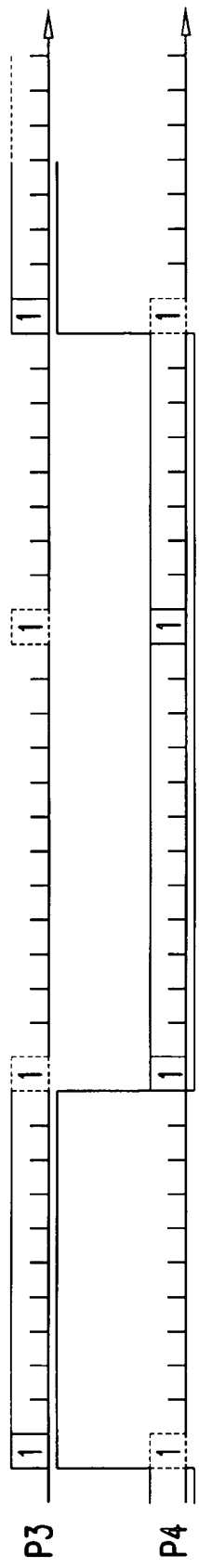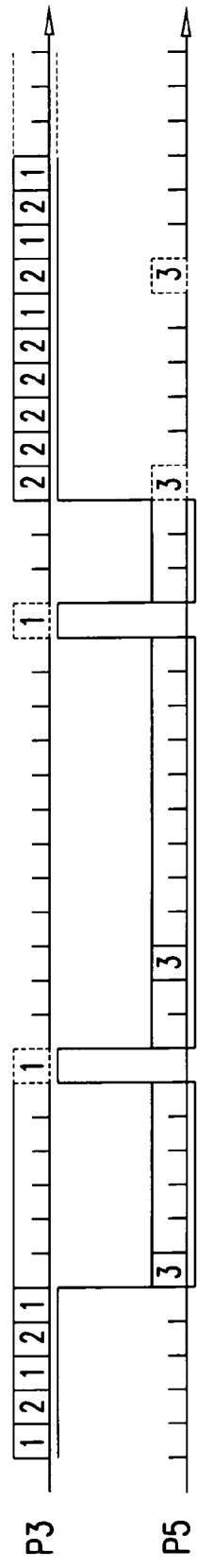

NODE 3 SWITCHING BETWEEN PICONETS

NODE 1 SWITCHING BETWEEN PICONETS

NODE 1 SWITCHING BETWEEN PICONETS WITHOUT FALLBACK

NODE 1 SWITCHING BETWEEN PICONETS WITH FALLBACK

RENDEZVOUS POINT INTERPICONET SCHEDULING

FIELD OF THE INVENTION

The present invention pertains to apparatus and methods of communicating in polling based communication infrastructure in an ad hoc network. In particular, the invention involves Bluetooth systems.

BACKGROUND

A polling based communication infrastructure may be used for the wireless communication of data and voice between devices. One method of achieving this is through the use of Bluetooth, an open specification for wireless communication. Bluetooth is a wireless personal area network (PAN) technology for short-range transmission of digital voice and data between mobile devices (e.g., laptops, PDAs, phones) and desktop devices. Bluetooth supports point-to-point and multipoint applications and is described in further detail in the *Bluetooth Baseband Specification* 1.1 by the Bluetooth Special Interest Group (SIG), which is expressly incorporated by reference in its entirety. Of a historical note, the name "Bluetooth" is derived from the 10th century King of Denmark, Harald Blåtand, alias Bluetooth, who introduced Christianity to Denmark.

The emergence of Bluetooth as a default radio interface in various types of devices provides an opportunity to turn them from stand-alone tools into networked equipment. Bluetooth offers a number of advantages over conventional wireless technologies. For example, unlike conventional infrared data transmission techniques which require line-of-sight between devices, Bluetooth uses omnidirectional radio waves that can transmit through walls and other nonmetal barriers. To counteract interference from outside sources or from other devices, Bluetooth units downgrade the transmission rate instead of halting transmissions altogether. However, there are also a number of new challenges associated with the Bluetooth technology, partly stemming from the fact that Bluetooth was originally developed for single hop wireless connections.

Bluetooth systems, in accordance with the *Bluetooth Baseband Specification* 1.1, use short range radio technology operating in the unlicensed 2.4 GHz Industrial-Scientific-Medical (ISM) band using a frequency hopping scheme. The hopping is performed on 79 RF channels spaced 1 MHz apart using a frequency hopping spread spectrum technique that changes its signal 1600 times per second. Bluetooth provides considerable data transfer capability at short ranges; e.g., up to 720 Kbps within 10 meters and up to 100 meters with a power boost. The Bluetooth system provides full-duplex transmission based on slotted Time Division Duplex (TDD) scheme, where each slot is 0.625 ms long.

FIG. 1 depicts an exemplary Bluetooth piconet. Bluetooth (BT) units are organized into "piconets" which are collections of devices connected in an ad hoc fashion. Bluetooth piconets are "ad hoc" in that Bluetooth units are free to enter and leave, that is, the piconets are not fixed networks. A piconet is initially formed with two connected devices, herein referred to as "nodes". One Bluetooth device in each piconet acts as the master, and can have any number of slaves, out of which up to seven can be active simultaneously. The piconet in the figure has one master node, BT 11, and one slave node, BT 12. A "master" is the device in a piconet whose clock and hopping sequence are used to sequence other devices in piconet. A "slave" is any other device in the piconet. The terms "master" and "slave" are defined as logical states, in that a particular Bluetooth device can be a master or a slave. In fact, a Bluetooth unit can simultaneously be a master in one piconet and a slave in one or more other piconets.

FIG. 2 illustrates a piconet with a master node 21 and a plurality of slave nodes 22–28 arranged in a star network topology. In a Bluetooth system, a slave node can only communicate directly with its master node. If slave node 22 wishes to communicate with slave node 26, slave node 22 would have to transmit the information it wished to communicate to master node 21. Master node 21 would then transmits the information to slave node 26. In addition to being classified as a master node and slave node, a node may be classified as an idle node. An idle node is a node which is not currently participating in a piconet.

The communication within a piconet is organized by the master which polls each slave according to some polling scheme. Master-to-slave transmissions always start in an even-numbered time slot, while slave-to-master transmissions always start in an odd-numbered time slot. A "frame" includes a pair of corresponding master-to-slave and slave-to-master slots. A master has frames which are in common with those of its slaves since a master's clock and hopping sequence are used to sequence its slaves. A slave is only allowed to transmit in the current slave-to-master slot if it has been polled by the master in the previous master-to-slave slot. The master may or may not include data in the packet used to poll a slave. Bluetooth packets can be one, three or five slots long and they can carry synchronous data (e.g., real-time traffic such as voice data) on Synchronous Connection Oriented (SCO) links. Bluetooth packets can also be used to communicate asynchronous data (e.g., elastic data traffic which tend to be less sensitive to delays) on Asynchronous Connectionless (ACL) links.

FIG. 3 depicts an exemplary scatternet comprising piconet 1, piconet 2 and piconet 3. A scatternet is formed by multiple independent and unsynchronized piconets. A Bluetooth unit can participate in (e.g., belong to, or be a member of) more than one piconet at any time, but it can be a master in only one piconet. A Bluetooth unit can be a master of one piconet and also be a slave of one or more other piconets. A unit that simultaneously belongs, or may belong, to more than one piconet is a Participant in Multiple Piconets (PMP) node. Since Bluetooth units can transmit or receive in only one piconet at a single point in time, PMPs switch between piconets on a time division basis. That is, a PMP switches back and forth between piconets to communicate in one or the other, hence abiding by the premise that a Bluetooth unit can transmit or receive in only one piconet at a single point in time. A set of independent, non-synchronized piconets that are interconnected is referred to as a "scatternet" network. Since different piconets are not synchronized in time, a PMP tends to lose some time when switching from one piconet to another. Furthermore, the temporal unavailability of PMP nodes must be taken into account when coordinating the communication with them. The inefficiencies of switching between piconets present a significant constraint in building scatternets.

The piconet 1 of FIG. 3 includes a master node 33, and the slave nodes 31, 32 and 34. The piconet 2 includes the master node 35, and the slave nodes 34, 36, 37 and 38. The piconet 3 includes the master node 39, and the slave nodes 38, 40 and 41. PMP nodes 34 and 38 are used to implement the scatternet shown in the figure. If, for example, node 31 wishes to communicate with node 40, then nodes 34 and 38 might act as bridging nodes by forwarding packets between the two piconets and in particular between nodes 31 and 40. Node 31 transfers the information to node 33, the master node of piconet 1. Master node 33 transmits the information to forwarding node 34. Forwarding node 34 then forwards the information to master node 35, which in turn, transmits the information to forwarding node 38. Forwarding node 38 forwards the information to master node 39 which transmits the information to the destination node 40.

Each Bluetooth unit has a globally unique 48 bit IEEE 802 address. This address, called the Bluetooth Device Address (e.g., BD_ADDR) is initially assigned at the time the Bluetooth unit is manufactured. In addition, the Master of a piconet assigns a local active member address (e.g., AM_ADDR) to each active member of the piconet. The AM_ADDR, which is only three bits long, is dynamically assigned and deassigned and is unique only within a single piconet. The master uses the AM_ADDR when polling a slave in a piconet. However, when the slave, triggered by a packet from the master addressed with the slave's AM_ADDR, transmits a packet to the master, it includes its own AM_ADDR (not the masters) in the packet header.

Even though all data is transmitted in packets, the packets can carry both synchronous data, on Synchronous Connection Oriented (SCO) links which is mainly intended for voice traffic, and asynchronous data, on asynchronous connectionless links (ACL) links. Depending on the type of packet that is used, an acknowledgment and retransmission scheme is used (not for SCO packets transferring synchronous data) to ensure reliable data transfer, as well as forward error correction (FEC) in the form of channel coding.

A Bluetooth unit participating in multiple piconets does so on a time division basis. Hence, its presence in the different piconets must be controlled by some scheduling mechanism. Such scheduling is denoted interpiconet scheduling as opposed to intrapiconet scheduling which is a mechanism controlling the master's polling of its slaves.

Interpiconet scheduling is perceived as one of the greatest obstacles on Bluetooth's path to success. Due to the need to synchronize its radio from one piconet to another, a Bluetooth unit necessarily loses some time while switching, which represents an important performance constraint in scheduling the scatternet. Furthermore, the temporal unavailability of PMP nodes must be taken into account when coordinating the communication with them. The inefficiencies of interpiconet communication present a significant constraint in building scatternets.

There are two effects that can significantly reduce the efficiency of the polling based communication in Bluetooth scatternets. First, nodes that have no data to transmit may be unnecessarily polled, while other nodes with data to transmit may have to wait to be polled. Second, at the time of an expected poll one of the nodes of a communicating node pair may not be present in the piconet. For example, the slave that is being polled may not be listening, or the slave expecting to be polled is not polled by its master. Both situations give rise to inefficiencies in carrying out communications.

One primary problem in interpiconet communication arises in trying to effectively coordinate the presence of PMP nodes in different piconets such that the occurrence of timing conflicts is minimized. A conflict occurs if a PMP node is assumed to be active by one or more of those piconets it participates in, but the PMP node is out of the piconets or otherwise unavailable. It can be equivalently disadvantageous if the PMP node is active in one of the piconets that assumes the PMP node to be inactive at that time. These are not the only issues leading to inefficiencies in an interpiconet scheduler. For example, the pre-scheduling and the intrapiconet communication should also be considered.

The timing of reaction time is a common idealization which does not always reflect real-world conditions. For instance, designs of Bluetooth scheduling algorithms often assume that the scheduler reacts in frame f(n+1) to occurrences in frame f(n). However, due to the non-ideal nature of electronic hardware, it is often not possible to react that fast. In effect, what happens in frame f(n) will generally not affect the schedule until k frames later, i.e., frame f(n+k), where k>>1. Such delay can, for example, be introduced by batched scheduling. Batched scheduling means that instead of scheduling frames one by one in a continuous flow, a schedule is computed for a number of frames; e.g., a batch of frames is scheduled all at once. While one batch is being executed the next batch is computed. Since the frames are batched for execution rather than continuously scheduling them, a delay is introduced which leads to inefficiencies in the system.

The fundamental building block in Bluetooth is the piconet. One system for intrapiconet scheduling is the Fair Exhaustive Polling system (FEP). Such schedulers divide the capacity within the piconet according to the dynamic bandwidth demands of the traffic. However, interpiconet scheduling is still needed to enable devices to simultaneously participate in multiple piconets. In fact, even for devices with interpiconet scheduling capabilities most traffic tends to be contained within one piconet. That is, large portions of their time will be as members of one piconet. The importance of efficient intrapiconet scheduling will not decrease when interpiconet scheduling is introduced, and therefore an interpiconet scheduler must not deteriorate the intrapiconet scheduler.

SUMMARY

Some disadvantages may arise in interpiconet scheduling systems. For example, schemes to provide a scheduling window agreement tend to cause scheduling rigidity. Rigid scheduling windows can disadvantageously cause schedule changes to propagate through the entire scatternet. The result is often a relatively large overhead and an inability of the algorithm to respond rapidly to traffic changes.

Attempts to provide a system for information exchange may involve the negotiation of scheduling windows. However, such negotiation schemes may involve relatively large amounts of non-payload data being transmitted. This, in turn, also creates large signaling overhead.

Scheme for signaling a node's plans to leave and to return unduly limits the node's flexibility to choose which piconet to be active in. This especially holds for the return time since a node has to decide when it wants to return without having any information about the situation in its other piconets. In general, the use of negotiation in the scheduling mechanism is a rather demanding concept, both in terms of data overhead and complexity.

Another problem arises due to intrapiconet scheduling being conveyed within the master unit, and the slave does not know when it is going to be polled. To be sure that the master receives the message holding plans about expected leave and return times, a slave may have to signal the information a long time before it plans to leave. If potential link failures are considered, the slave may need to perform such signaling with especially long lead times, leading to further degradation of performance. This is especially disadvantageous if the queues of both ends of a link are drained, and the PMP slave has to wait until the next POLL from its master before it can inform the master that it wants to leave.

For a PMP slave of a piconet, which may be a master in another piconet, the information regarding the time the slave is slated to leave may be lost. When the leave time information is lost, the information about the expected return time is also lost since they are conveyed in the same packet. If the master does not know when the slave is going to disappear, a great number of unsuccessful polls could result since the master can not determine whether the node has disappeared as opposed to a breakdown in communication due to a bad link. This, of course, degrades system performance and leads to increased overhead.

Similarly, a situation may arise in which a PMP slave, which may be a master in another piconet, either does not signal its expected return time, or the return time signal is lost. Such situations inevitably lead to performance degradation. Even worse, if the packet was lost the slave will assume that it is still active based on an expected return time, whereas the master may consider the slave to be inactive since it received no expected return time message. Hence, the slave, who expects to be polled, will not be polled, leading to degradation in performance.

The present invention provides an interpiconet scheduling mechanism that overcomes these drawbacks and provides a number of advantages. The present invention includes embodiments drawn to a novel way of distributing rendezvous (RV) points. RV points are points in time, e.g., slots or frames, that are known by the nodes of both sides of a link, and that help these nodes to coordinate their communication. An RV point may have associated with it a payload window for the exchange of data between nodes.

In accordance with the present invention, no coordination information needs to be exchanged between the nodes to set up the RV points. This means that data exchange may be initiated immediately without any prior negotiation or learning period. In accordance with the present invention, a set of RV points that are well-defined and unique for a particular PMP may be generated on the basis of some unique information about the PMP (e.g. its BD_ADDR). By defining RV points in this way, per node rather than per link, it is possible to define the associated payload windows where the PMP node and its peer nodes can be present simultaneously.

The present invention includes embodiments drawn to a signaling scheme which conveys where a node is to be present during time windows. In accordance with the present invention, bandwidth allocation can be dynamic and resources may be adapted rapidly to bursty sources. The present invention works well with prescheduling, and intrapiconet schedulers may readily be adapted or modified for use with the present invention. Furthermore, the dependencies between the inter- and the intrapiconet schedulers are kept at a minimum to cater for independent evolution in both fields.

Embodiments of the present invention provide a number of advantages. For example, by defining the RV points per node instead of per link, the present invention defines time windows where peer nodes are present simultaneously. In addition, a Rendezvous Point Interpiconet Scheduling (RIPS) system in accordance with the present invention works well with prescheduling. Another advantage of RIPS is that minimal or no new information needs to be exchanged between a PMP and its peers to enable the peers to determine the absolute timing of the PMPs RV points.

Furthermore, since PMPs are free to decide which piconet to be present in during each time window, dynamic allocation of bandwidth is enabled and resources may be adapted rapidly to bursty sources. RIPS also provides for the use of existing intrapiconet schedulers if the notion of present and absent slaves is included in them. Another advantage arises from the use of pseudo random RV points which reduces the need for coordination and combats the drawbacks of cyclic schemes, such as deadlocks and unfairness. In using the RIPS system, the mechanisms are decentralized and propagation of negotiations is avoided. Since slaves do not switch piconet unexpectedly in RIPS, the master node is able to know when they will disappear. It should be mentioned that the RIPS mechanisms are independent of the existing Bluetooth power save modes. Finally, with RIPS Quality-of-Service (QOS) can be supported in regard to both bandwidth and delay.

Embodiments of the present invention are drawn to methods and apparatus for communicating in an ad hoc polling based communication infrastructure, wherein a PMP node of one piconet may exchange data with a master node of that piconet within a payload window associated with a first RV point. The PMP node may also belong to a second piconet, and exchange data with another master node of the second piconet in a second payload window, the second payload window being associated with a second RV point of the PMP node. In accordance with the present invention, the master nodes of each piconet to which the PMP belongs is informed of the PMPs switches to other piconets since the PMP switch information, that is, the rendezvous (RV) points of various piconets are associated with the PMP node itself, rather than being associated with the links of the PMP node and its master node(s). It should be noted that in embodiments of the present invention, a PMP node in one piconet may be a master node in another piconet. Furthermore, the ad hoc polling based communication infrastructure in which the present invention is embodied may be a Bluetooth system.

BRIEF DESCRIPTION OF THE DRAWINGS

The objects, features and advantages of the present invention will become more readily apparent to those skilled in the art upon reading the following detailed description, in conjunction with the appended drawings, in which:

FIG. 9 depicts an example of the basic behavior of the algorithm applied to the scatternet disclosed in conjunction with FIG. 4;

FIG. 10 illustrates the precedence of one exemplary precept over another;

DETAILED DESCRIPTION

In accordance with embodiments of the present invention, RV points are defined per PMP node rather than per link. This allows payload windows to be unambiguously defined for each PMP, where the length of each payload window equals the distance between two RV points. In this way, a master can use the information about the beginning and end of each payload window defined for a PMP node to know when to expect the PMP node's presence.

Figure 1:
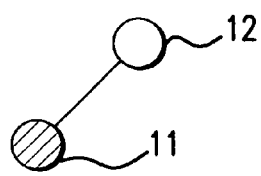
FIG. 1 depicts an exemplary Bluetooth piconet.
Figure 2:
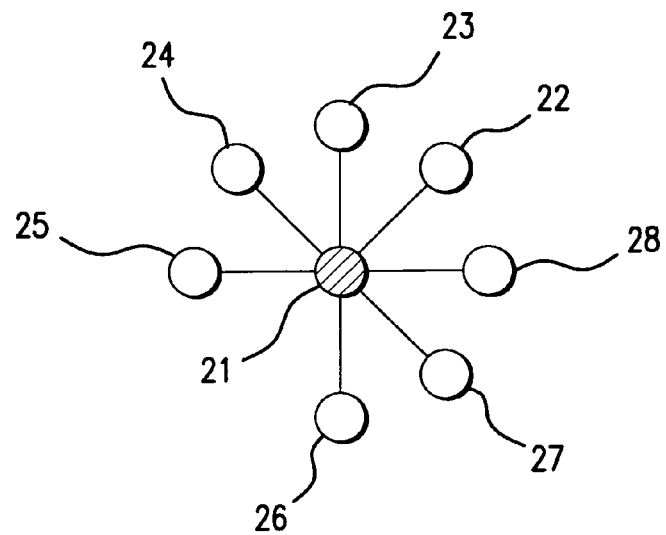
FIG. 2 illustrates a piconet with a master node 21 and a plurality of slave nodes 22–28 arranged in a star network topology.
Figure 3:
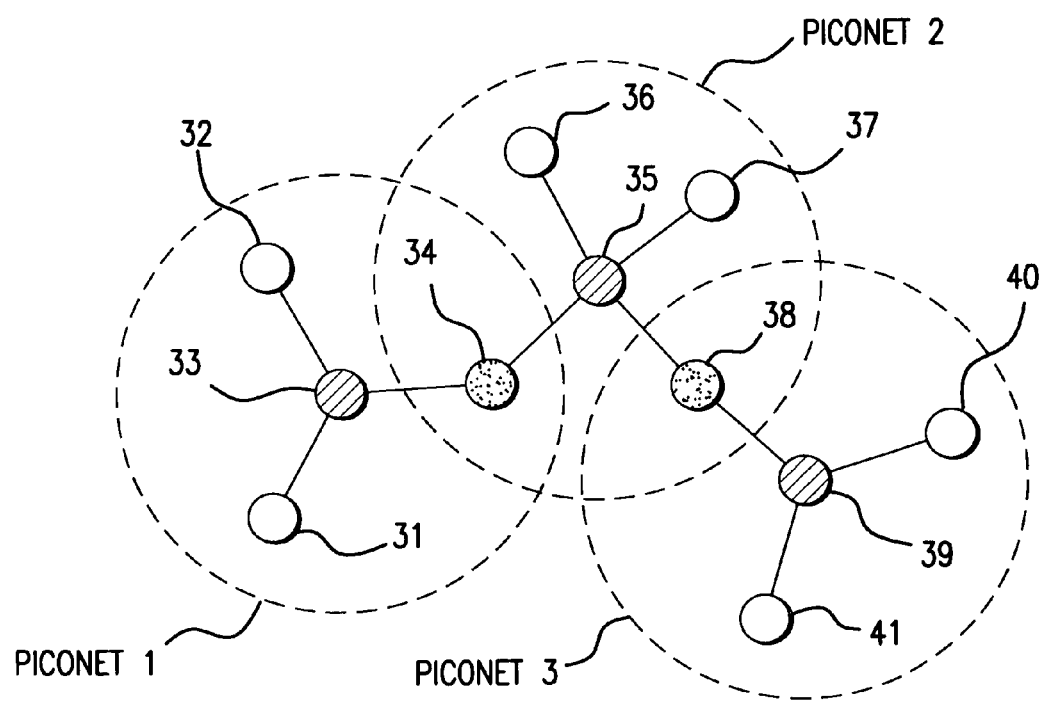
FIG. 3 depicts an exemplary scatternet comprising piconet 1, piconet 2 and piconet 3.
Figure 4:
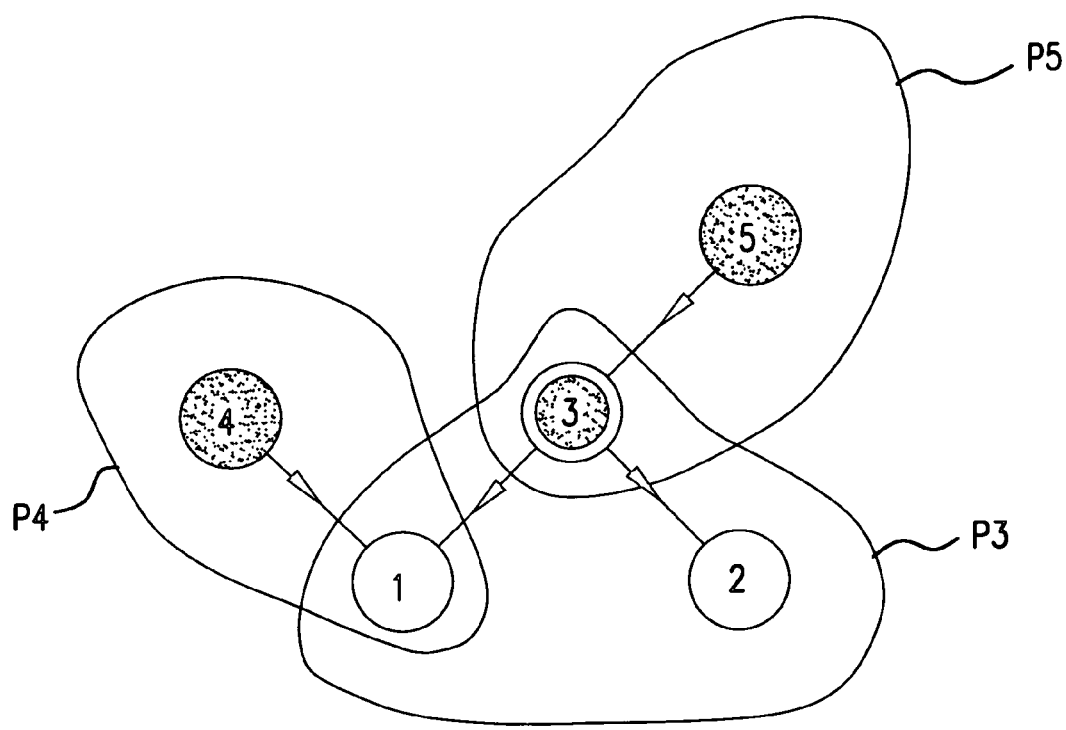
FIG. 4 depict a PMP which belongs to two piconets.
Figure 5A:
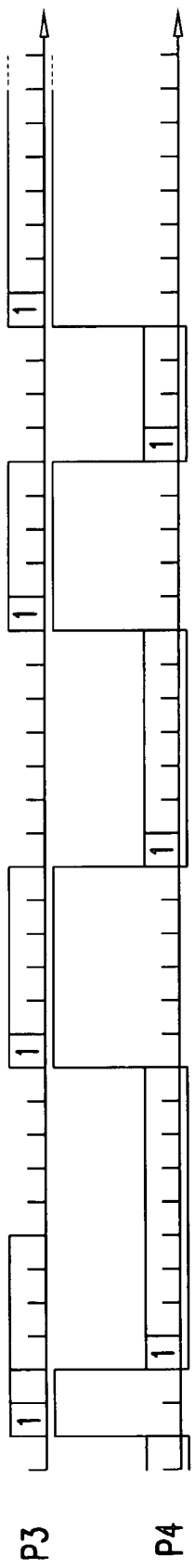
FIGS. 5(a) and 5(b) provide an exemplary illustration of a sequence of RV points defined per link versus RV points being defined per PMP.
Figure 5B:
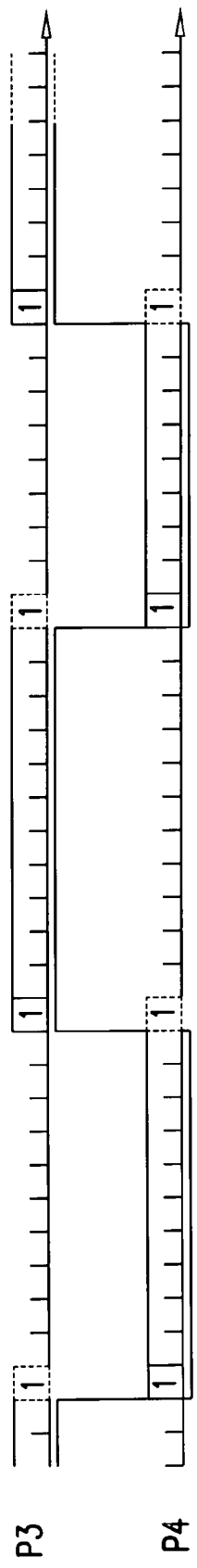

FIG. 4 in conjunction with FIGS. 5(*a*) and 5(*b*) provide an exemplary illustration of a sequence of RV points defined per link versus RV points being defined per PMP. By way of convention for the figures herein, the black nodes of FIG. 4 are master nodes (e.g., nodes 4 and 5 of FIG. 4), the white nodes are slave nodes (e.g., 1 and 2), and a node indicated with black and white is both a master and a slave (e.g. node 3). Piconets are labeled as "P#" (e.g., "P3" and "P4" of FIG. 4, FIG. 5(*a*) and FIG. 5(*b*)). Finally, in the various frames of the time line, by convention the numbers contained in solid-line boxes indicate a successful RV point (e.g., FIG. 5(*a*)), while the numbers contained in dashed-line boxes indicate an unsuccessful RV point (e.g., the first RV point for P3 in FIG. 5(*b*)). By "unsuccessful" it is meant that a node does not show up during an RV point. By "successful" it is meant that a node shows up during an RV point. Consider the topology in FIG. 4 which includes three piconets, P3, P4 and P5. Node 1 is a slave in piconets P3 and P4. Node 3 is master in piconet P3 and a slave in piconet P5.

FIG. 5(*a*) depicts an example in which Node 1 switches between piconets P3 and P4 using RV points that are defined per link. In the frame of the first RV point shown in the figure, Node 1 starts out as a member of piconet P3. Then, two frames later, Node 1 switches to piconet P4 in frame 4. Another nine frames later, Node 1 switches back to piconet P3. A problem arises because neither master Node 3 nor master Node 4 knows how long that the slave Node 1 will stay after each RV point. For example, after Node 1 switches out of piconet P3 to P4 the first time (i.e, in the frames following the fourth frame shown), the master of piconet P3, Node 3, is not aware that Node 1 has switched out of piconet P3. The reason for this is that, although Node 1 stays until the next RV point in the other piconet, the master nodes Node 3 and 4 only know about the RV points on their own link.

FIG. 5(*b*) depicts an example in which Node 1 switches between piconets P3 and P4 using RV points defined per node in accordance with the present invention. The RV points are "per node" in the sense that they are based upon information which is specific to the PMP node. In one embodiment, the PMP node's BD_ADDR may serve as the basis for defining the PMP node's RV points. Since the RV points are based on PMP specific information, the RV points in one piconet for a particular PMP node will be the same as the RV points in another piconet for that particular PMP node.

In FIG. 5(*b*), the RV points, which are defined per node, are used for both master nodes, Node 3 and Node 4. As shown in the figure, Node 1 starts out in piconet P3, switches to piconet P4, and then switches back to piconet P3, in a manner akin to FIG. 5(*a*). However, in the embodiment depicted in FIG. 5(*b*), master Node 3 knows that slave Node 1 is not going to be in piconet P3 following the first RV point (i.e., the RV point in the third frame of the figure) since Node 1 did not show up for the first RV point. That is, because Node 1 missed the first RV point, then Node 3 knew that Node 1 would not be in piconet P3 for the ensuing payload window following the RV point. Since the RV points are defined per node, piconet P3 knows in frame 4 that Node 1 has switched to piconet P4.

In other words, by defining the RV points per node (instead of per link), a PMP slave node belonging to two or more piconets will have the same RV points in all of its piconets. If the slave node attends an RV point in any particular piconet, the master node of that piconet can determine that the slave node will also attend the associated payload window. However, if the slave node does not attend an RV point in a particular piconet, the master node of that piconet will know that the slave node will also not attend the associated payload window.

Figure 6A:
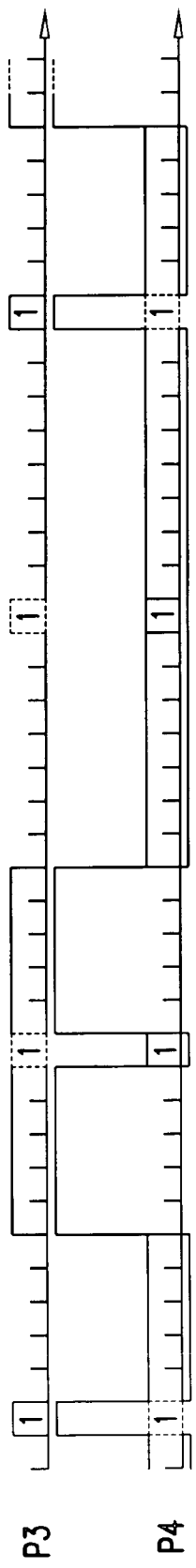
FIGS. 6(a) and 6(b) illustrate exemplary time delays between an RV point and its associated payload window.
Figure 6B:
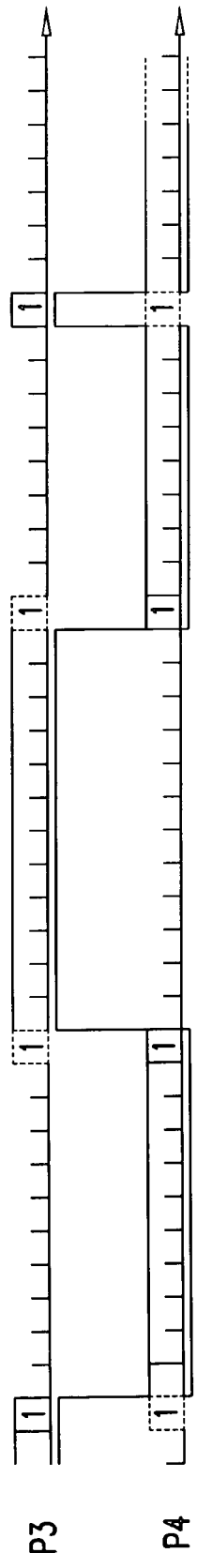

FIGS. 6(*a*) and 6(*b*) illustrate exemplary time delays between an RV point and its associated payload window. As used herein, a "payload window" is a time window during which payload data may be exchanged between two nodes. An RV point may have a payload window associated with it. Ideally, the payload window corresponding to an RV point starts directly at the RV point and continues until the next RV point. However, to enable prescheduling, the payload window may start at some later point in time, e.g. after a predefined offset, or after the next RV point. In any case, each RV point has a corresponding payload window. An example of how this could look like is depicted in the figure. In FIG. 6(*a*) there is a fixed delay of five frames between the RV point and its corresponding payload window. In FIG. 6(*b*) the corresponding payload window starts after the next RV point. For the second scheme to work, it is preferable that a minimum distance between the RV points be defined.

In accordance with another embodiment of the present invention, the corresponding payload window starts after two or more RV points. This alleviates the need for a minimum distance between the RV points. The RV points are preferably distributed in a pseudo random fashion. This avoids drawbacks due to performing coordination in a periodic RV point distribution. One disadvantage with distributing the RV points pseudo randomly is that RV points tend to collide every now and then. However, due to the randomness, these collisions do not penalize any specific node more than other nodes.

Figure 7:
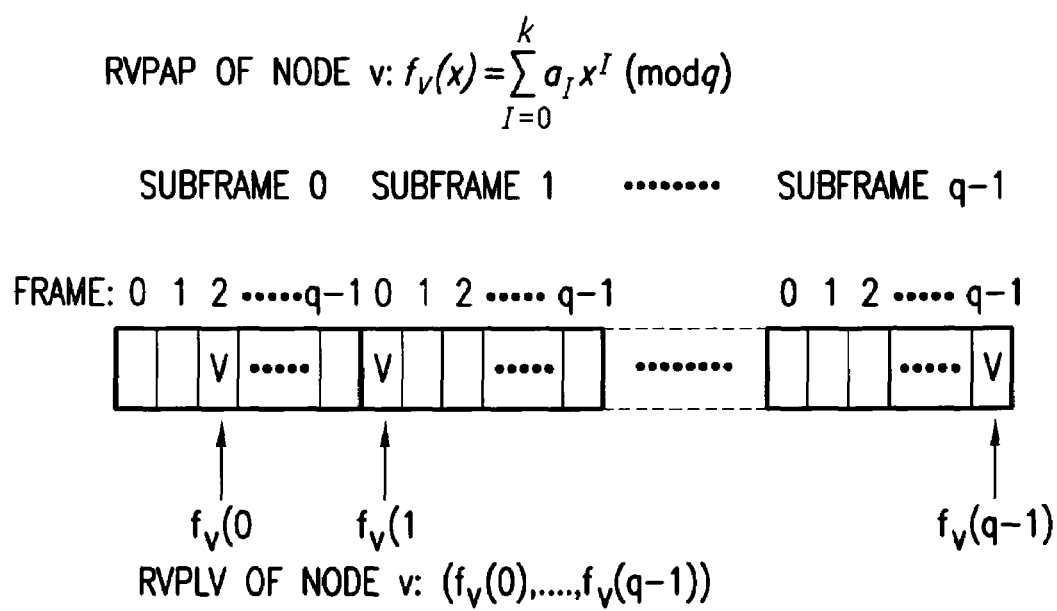
FIG. 7 depicts an exemplary frame structure for use in developing a distributed pseudo random sequence of RV points.

FIG. 7 depicts an exemplary frame structure for use in developing a distributed pseudo random sequence of RV points. In accordance with one embodiment, a unique pseudo random sequence of RV points can be calculated in a distributed manner. That is, RV points are distributed using a pseudo random sequence. It is preferred that the same sequence can be generated unambiguously by peer nodes. There are a number of ways in which such a pseudo random sequence could be generated. One way of generating such a sequence is to use the theory of Galois fields. This may be achieved by letting GF(q) be the Galois field of order q, wherein q is of the form $q=p^m$ given that p is a prime number and m a positive integer. For the relationship m=1, the elements, of GF(q), can be represented by the natural numbers in the interval [0,q-1]. If q is a prime power, the representation is more involved, but may readily be used in accordance with the present invention.

A Bluetooth scatternet may be formally modeled by a directed graph G=(VE), where the direction indicates the master-slave relation (from master to slave), where V is the set of nodes (vertices) and E is the set of links (edges). Using the Galois field GF(q), where q is a prime, time is divided into q subframes of length q frames ($N_{sf}$=q), i.e. the total length of the superframe is $q^2$ frames. In each subframe one frame is selected as an RV point for each node. To be able to do this pseudo randomly a polynomial, called the Rendezvous Point Assignment Polynomial (RVPAP), is assigned over GF(q) to each node. This polynomial is represented as $fv(x)=\Sigma_{I=0}k\ a_Ix^I$ (mod q), v∈V, and maps from $Z_q$ to $Z_q$. The coefficients $a_I$∈GF(q) are derived from the BD_ADDR of the node. The RVPAP is used to calculate the positions of the RV points for each node within a subframe. Let us also define the Rendezvous Point Location Vector (RVPLV) as$f_v(S)$, v∈V, where S is a standard row vector in which the elements of GF(q) are enumerated. The RVPLV indicates the exact position of the assigned RV points in each subframe for each node. FIG. 7 depicts the relationship of exemplary RVPAP and RVPLV frame structures.

Figure 8A:
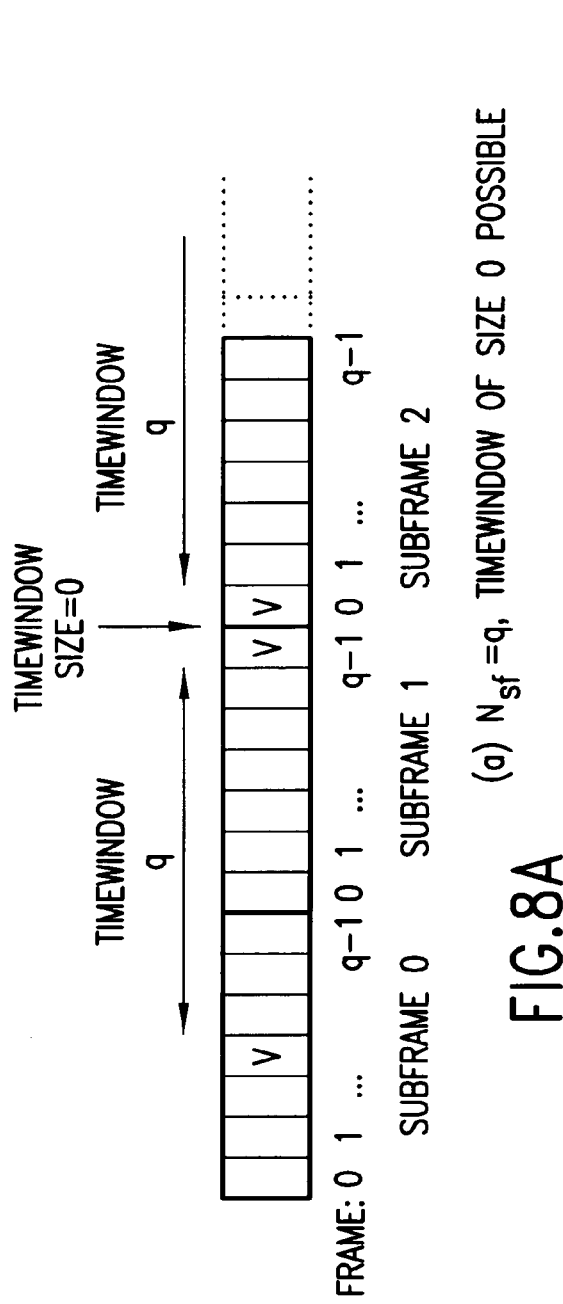
FIGS. 8(a) and 8(b) illustrate the relationship between subframe length and the sequence length in an exemplary cyclical pseudo random sequence.
Figure 8B:
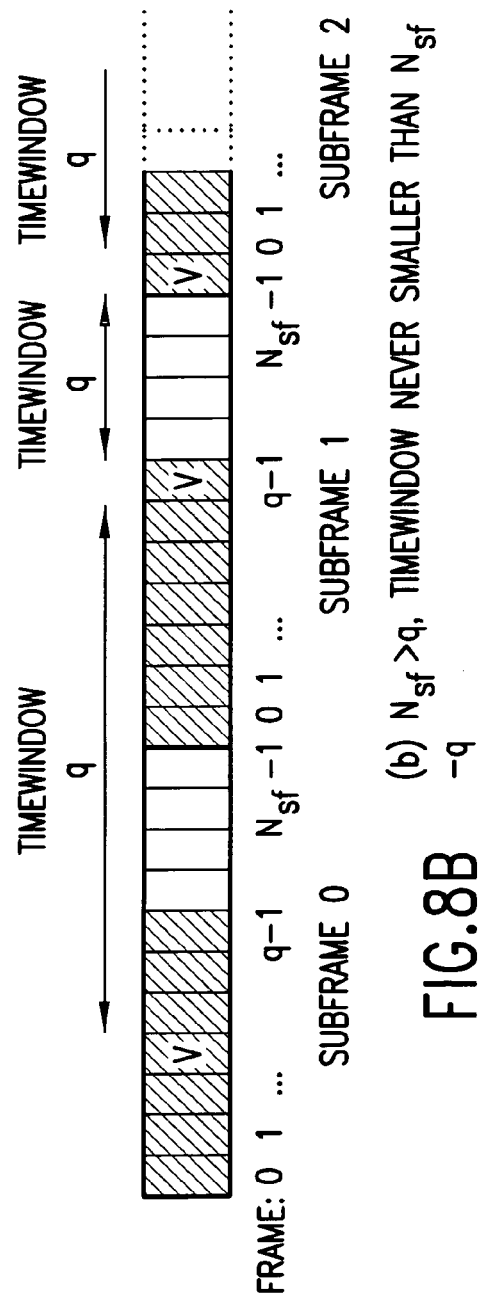

FIGS. 8(*a*) and 8(*b*) illustrate the relationship between subframe length and the sequence length in an exemplary cyclical pseudo random sequence. One issue to consider when using Galois fields to generate pseudo random sequences is the length of the generated sequences. As can be seen in FIG. 8(*a*) depicts a pseudo random sequence which is cyclic with period q. To produce a subframe with a short length (i.e. q small) the length of the sequence will also be short. This results a pseudo random sequence which repeats itself more often than desired. One way to overcome this is to utilize a "larger" Galois field, e.g. use a larger q, and then have a mapping function from this field to the frames. For example, to double q and thereby double the length of the sequence cycle, one possible mapping function is y=⌈x/2⌉ where x is the output from the polynomial and y is the actual frame used for the RV point. In this way, q along with the length of the sequence cycle are doubled, without doubling the length of the subframes.

When using Galois fields in conjunction with the RIPS algorithm, care should be taken in distributing the RV points to provide a predetermined minimum distance between two consecutive RV points. That is, the payload window used for communication should not be allowed to approach a length of zero. This is illustrated in FIG. 8(*a*). One way of achieving the minimum distance is to let the length of the subframe, $N_{sf}$, be longer than q. By letting only the first q frames of the subframe be used for RV points, the minimum distance between any two RV points is $N_{sf}$−q, as illustrated in FIG. 8(*b*).

In accordance with one embodiment, the following two steps can be taken to generate a unique pseudo random sequence:

Time is divided into subframes of length $N_{sf}$ frames, or $T_{sf}$ seconds ($T_{sf}=N_{sf}·T_f$, $T_f$=length of one frame).

In each subframe one frame is pseudo randomly selected as RV point.

Information about $N_{sf}$, the BD_ADDR and the clock of the PMP is used to distribute the RV points in a pseudo random sequence. Since synchronization between piconets is not required, knowing the PMP clocks at both ends of the link allows peer nodes to calculate the absolute timing of the RV points. The BD_ADDR and the clock are exchanged whereas $N_{sf}$ either has to be signaled and/or predetermined.

Other pseudo random techniques may be used with embodiments of the present invention. For example, another way of generating such a pseudo random sequence is based on use of the frequency hopping sequence selection (FHSS) algorithm used by Bluetooth nodes, which is defined in the Bluetooth Baseband Specification 1.1. It should be noted that the other parts of the present invention do not rely on the sequence of RV points being pseudo random, only that the RV points are defined per node instead of per link. In alternative embodiments of the present invention, periodic RV points may also be used. Furthermore, defining the RV points per node can be achieved by the same means as techniques of defining them per link. For example, the SNIFF mode can be used to define RV points. In the SNIFF mode, a slave device operating in a power-saving mode listens to the piconet at reduced rate, thus reducing its duty cycle. If a node uses SNIFF mode to define RV points for a link, the "per node" RV points can be achieved by setting up identical SNIFF agreements on all of the node's other links.

As disclosed above, one advantage of the present invention is that by letting the PMPs define a sequence of RV points, a sequence of payload windows is also defined. PMPs can signal their presence during these payload windows in a number of different ways, according to various embodiments of the present invention. In one embodiment, the PMPs signal their presence by setting up a long-term schedule. In another embodiment, signaling is performed for specific payload windows. These alternative embodiments, as further disclosed below, can be used independently, or can be combined.

Embodiments involving a long-term schedule of PMP presence can be achieved in several ways. For example, a node can decide to be present in a piconet every k:th payload window and inform the master in that piconet about this decision. Alternatively, the signaling of presence can be achieved by using a superframe consisting of n payload windows, which is scheduled a sufficient time beforehand. The required signaling may consist of an n bit long bitmap where each bit represents one payload window. The bitmap specifies whether the PMP is active or inactive in the corresponding payload window. If the superframe is used once, a new bitmap is provided before the old superframe ends. If the superframe is used periodically, the need to generate a new bitmap is eliminated and the superframe is simply reused when it ends. The signaling to set up a long-term schedule can either be performed by using new LMP packets or by using in-band signaling.

Embodiments of specific payload window signaling may be achieved by having the PMPs each signal the piconets in which they expect to be present by showing up in each piconet at the PMP's RV point. A master can determine whether a PMP is present or not by polling at the PMP's RV point. If the PMP responds, the master may assume that the PMP will be present during the corresponding payload window. Otherwise, it can be assumed that the PMP will be present in some other piconet during that payload window. As a result of this signaling, a master knows when its slaves are present and when they are absent. This allows the master node to schedule its piconet accordingly.

An advantage of the specific payload window signaling embodiment is that it is dynamic and allows quick adaption to changing traffic demands. However, there is some overhead associated with the RV points, since masters are obliged to poll the PMP at these points and only one master gets a response. The embodiments using long-term scheduling do not include as much signaling, but tend to be less dynamic and slower in adapting to schedule changes.

FIG. 9 depicts an example of the basic behavior of the algorithm applied to the scatternet disclosed in conjunction with FIG. 4. Node 1 first decides to be present in piconet P3 by switching to that piconet at the time for its RV point in frame 2. Since the master in piconet P3, Node 3, gets a response from Node 1, it knows that Node 1 will be present in its piconet during the following payload window. Node 4 also polls Node 1 at this RV point but does not get a response. Thereby Node 4 knows that it does not have to consider (e.g., does not have to poll) Node 1 during the following payload window. At the next RV point, Node 1 decides to be present in piconet P4 and the various master nodes react accordingly.

The signaling at the RV points can be accomplished in a number of different ways, including the following. A first manner of signaling at the RV points can be performed implicitly by exchanging regular packets. However, if multislot packets are defined for a link the RV points on that link also have to be multislot. This results in a relatively large overhead in case of unsuccessful RV point. A second manner of signaling at the RV points is performed explicitly by an exchange of LMP packets. A benefit with this solution is that the LMP packets are limited to one slot, minimizing the overhead of unsuccessful RV points. Another benefit is that the LMP packets can carry information about the state of the nodes, such as amount of data waiting in queues, or other like information. A third way of signaling at the RV points can be performed explicitly by an exchange of POLL-NULL or NULL-NULL packets. The main benefit with this solution, besides being limited to one slot, is that it doesn't require anything new in the Bluetooth specification.

In summary, the following three basic rules may be used in applying the specific payload window signaling embodiment. First, a master preferably polls a PMP slave at the slave's RV points. Second, a master should not necessarily expect a response from a PMP slave at a RV point. Third, if a PMP slave shows up at an RV point, it should be available for polling by that master during the corresponding payload window. Thus, the master should assume that the slave will be present during the corresponding payload window.

FIG. 10 illustrates the precedence of one exemplary precept over another. That is, the precept that a master polls a PMP slave at the slave's RV points takes precedence over the precept that a master not necessarily expect a response from a PMP slave at a given RV point. In other words, rule number 1, as described above, has precedence over rule number 3. As shown in the figure, Node 3 has to leave piconet P5 in the middle of a payload window in order to poll Node 1 in its home piconet P3. Another point to make is that RV points may overlap, making it impossible to always fulfill rule number 1.

In the specific payload window signaling embodiment, RV points are used by PMPs to signal to masters that they will be present, i.e., available for polling. If a PMP acts as a master itself, it could be useful to let the PMP signal to its slaves when it will be absent, i.e., when it definitely will not poll the slaves. This is especially useful if the slaves are also PMPs since they then are able to use this time in their other piconets.

Figure 11A:
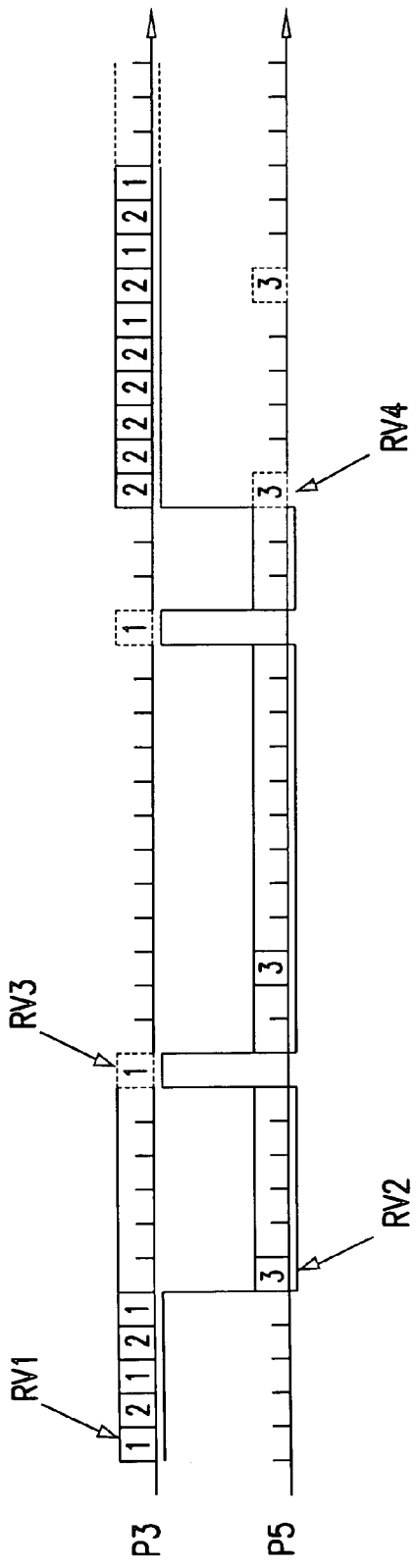
FIGS. 11(a) and 11(b) provide an exemplary illustration of the precept that a master should inform it PMP slave both when and for how long it plans to be absent.
Figure 11B:
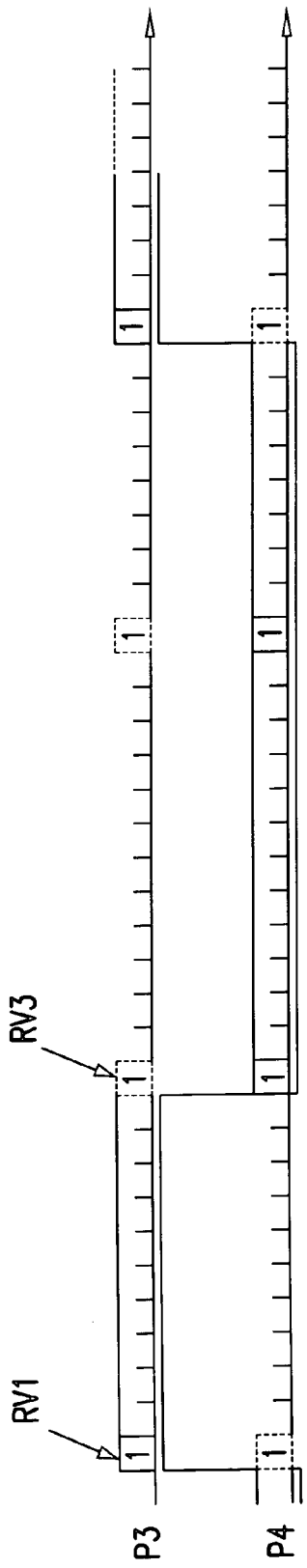

FIGS. 11(*a*) and 11(*b*) provides an exemplary illustration of the precept that a master should inform it PMP slave both when and for how long it plans to be absent. A PMP that shows up in a piconet at one of its RV points has elected to be present in that piconet during the corresponding payload window, even if the master in that piconet happens to be absent. In spite of this, the PMP would still benefit from being informed at its RV point when the master will be absent since the PMP then could avoid showing up in that piconet at upcoming RV points for as long as the master is absent. This implies that the master should inform both when and for how long it plans to be absent. An example of this is shown in FIG. 11(*b*), where Node 1 chooses to be present in piconet P4 for as long as the master, Node 3, is absent from piconet P3. At RV1, Node 1 visits piconet P3 since it has decided to be present in P3 until RV3. However, at RV1 Node 3 informs Node 1 that it will be absent from P3 until RV4. Between RV1 and RV2, Node 3 serves Node 1 as usual but at RV2 Node 3 switches to piconet P5. Node 1 is then left in P3 without possibility to switch piconet until its next RV point, RV3. At RV3, and the RV point following RV3, Node 1 chooses to be present in P4 instead.

To reduce the number of RV points at which a master has to poll its PMP slaves, every master nodes may maintain a list, referred to as an active list, containing the slaves to/from which the master knows there is data waiting to be communicated. By using this active list a master is able to determine whether it should poll a PMP slave at the slave's RV point or not. That is, if the PMP slave is active (i.e., in the active list) the master should poll the slave but not when the slave is inactive (i.e., not in the active list).

To be able to activate an inactive PMP slave, the master can make use of the $T_{poll}$ timer specified in Bluetooth Specification 1.1. By forcing the master and the PMP slave to communicate when the $T_{poll}$ timer expires, the master may put the PMP slave as active if either the PMP slave or the master itself has data to communicate.

In certain situations it is desirable for a PMP to be able to visit an RV point in a piconet without having to be present in that piconet during the corresponding payload window. One example occurs when a communication fails at the RV point, leading to a situation in which the master doesn't expect the PMP to be present during the corresponding payload window. Thus, it is meaningless for the PMP to be present in that piconet during that payload window. Another example is when the communication at the RV point is successful but both the master and the slave each signal that they have no data to exchange (e.g. by an exchange of LMP packets).

Figure 12A:
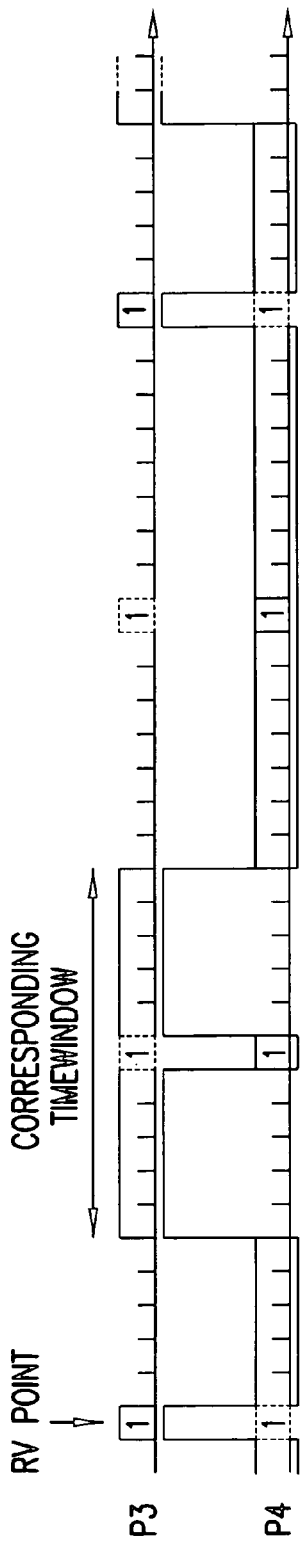
FIGS. 12(*a*) and 12(*b*) provide an exemplary illustration of a fallback mechanism.
Figure 12B:
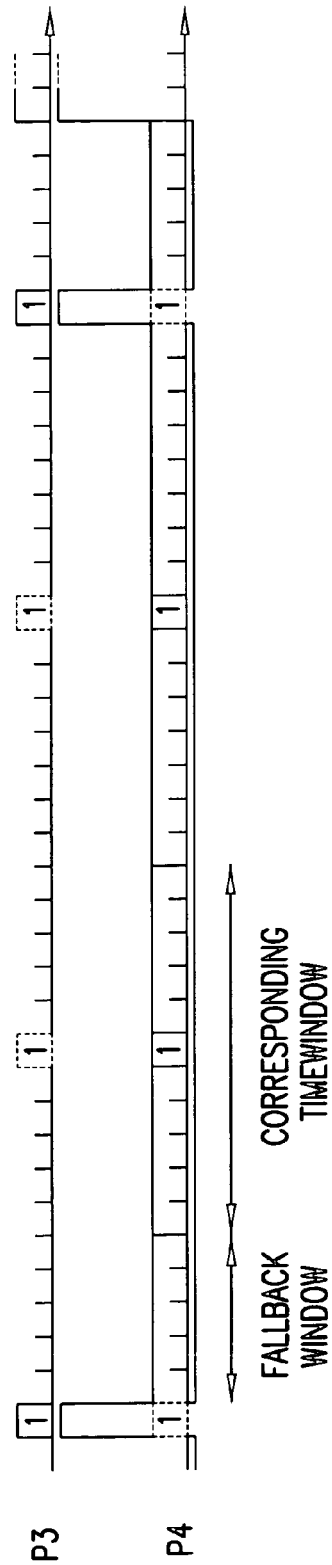

FIGS. 12(*a*), 12(*b*) and 13 provide an exemplary illustration of a fallback mechanism. To understand this concept, first consider the topologies of FIG. 4 where a PMP node has a master that also is a PMP node, such as Node 1 and Node 3, respectively. When Node 1 signals that it wants to be in piconet P3, Node 3 might not be present. This means that Node 1 won't get served during the corresponding payload window. Thus, it is desirable for Node 1 to be able to switch to piconet P4 instead. If Node 1 was present in P4 before visiting the RV point in P3, and there is a pre-scheduling delay between the RV point and the corresponding payload window, Node 1 will be present in P4 some frames before the corresponding payload window starts. During these frames Node 1 can signal to Node 4 that it wants to stay in P4 even though it wasn't present in P4 at the RV point.

Figure 13:
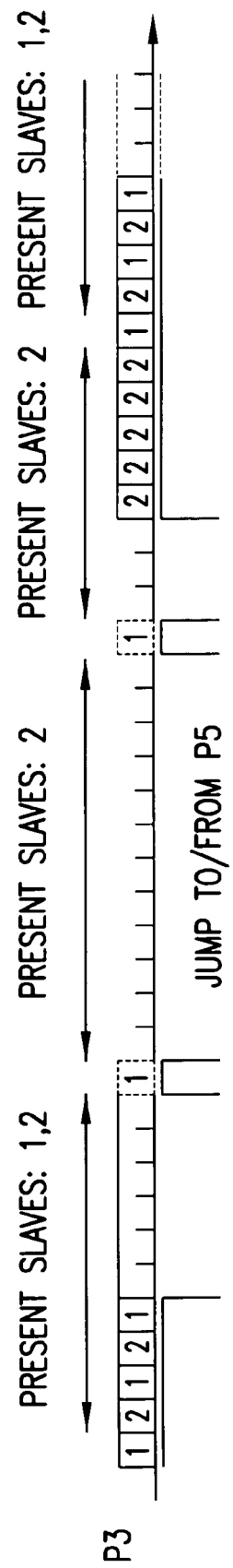
FIG. 13 depicts an example of the interpiconet scheduling entity providing a polling schedule for slave nodes.

The above described behavior is called the "fallback mechanism" and the window of frames between the RV point and the corresponding payload window is called the "fallback window." In FIG. 13 we see how Node 1 switches between piconets P3 and P4 both with and without using the fallback mechanism. When the figure starts, Node 1 is present in P4, but decides to be present in P3 at the first RV point. For some reason, Node 1 decides that it doesn't want to be present in piconet P3 during the corresponding payload window. Without the fallback mechanism, this wouldn't be possible; Node 1 would have to be present in P3 during the corresponding payload window since it was present at the RV point. This scenario is shown in (a). If the fallback mechanism is used, Node 1 may signal to Node 4 that it will be present in P4 during the corresponding payload window in spite of being absent at the RV point. This is possible since there is some time (e.g., the fallback window) when Node 1 is present in P4 before the corresponding payload window starts. If Node 1 is polled during this fallback window it can signal the decision to stay in P4 to Node 4. This signaling can be achieved either by means of in-band signaling or LMP packets.

When using the fallback mechanism, it is preferably a requirement of the master in PMP's piconet that the RV point does not assume that the PMP will be present during the corresponding payload window. If the communication at the RV point isn't successful this requirement is fulfilled. However, if the communication is successful the PMP slave has to signal that it won't be present during that payload window (e.g. by an exchange of LMP packets).

The embodiments for PMPs signaling their presence, e.g., the long-term schedule embodiment and the specific payload windows embodiment, can be combined. Some of the payload windows can be assigned to certain piconets, whereas others are assigned to several piconets. At the RV points corresponding to the latter payload windows, the masters would have to poll the PMP as in the specific payload windows embodiment, but in the RV points that are assigned to certain piconets, there is no uncertainty about where the PMP will be. If a bitmap is used to signal this information, at least 2 bits would be needed per payload window. They could for example be coded as present/absent and exclusive/non-exclusive. If absent then the second bit would not matter, but if present the second bit would matter: exclusive means that the payload window is assigned to this piconet only, so no further signaling is needed to determine whether the PMP will be present or not. Non-exclusive means that the payload windows are assigned to multiple piconets, so signaling at the corresponding RV point is needed to determine whether the PMP actually will be present or not.

In spite of its pseudo randomness, the invention enables support for quality of service (QoS) features. Because of the notion of payload windows, statistical bandwidth guarantees can easily be supported. In using the present invention, a node's available bandwidth is divided into payload windows. By assigning a certain portion of the payload windows to a certain piconet, that piconet can be guaranteed a statistically certain portion of the bandwidth. Since a node has control over its payload windows, it has control over the length of time it is away from a piconet. This fact can be used to support delay sensitive traffic. Conventionally, the shortest time a node can be away from a piconet is one payload window, e.g., by being present in that piconet every other payload window. However, by forcing the master and the PMP slave to communicate when the $T_{poll}$ timer expires, as proposed above, extra support for nodes with special delay requirements can be given. With this mechanism, the lower bound of one payload window is removed; even shorter delay requirements can be met.

FIG. 13 depicts an example of the interpiconet scheduling entity providing a polling schedule for slave nodes. As disclosed above, the scheduling may conceptually be divided between inter- and intrapiconet scheduling entities. For a PMP node, the interpiconet scheduling entity decides which piconet the node should show up in for each of its RV points. The interpiconet scheduling entity also sees to it that the node is present in that piconet during the corresponding time window. If acting as a master, the interpiconet scheduling entity would see to it to poll each of its PMP slaves at their RV points.

In this embodiment the intrapiconet scheduling entity may perform normally, e.g., when acting as master it handles the scheduling of when to poll its slaves., However, one thing needed is a way for the interpiconet scheduling entity to inform the intrapiconet scheduling entity which nodes are present (including their payload windows) and which are not. Thereby, the intrapiconet scheduler would not have to take absent PMP slaves into consideration when constructing its schedule. This is shown in FIG. 13, where the intrapiconet scheduling entity in Node 3 acting as master uses the information about which slaves are present and not. As illustrated, Node 3 schedules to poll both slaves when they both are present but only Node 2 when Node 1 is away. Another advantage with using this information about present slaves is that it would be possible for the intrapiconet scheduler to take certain care when a PMP slave eventually is present, e.g., give a PMP more capacity when it is present. An intrapiconet scheduler may also handle PMP slaves that leave the piconet without notice.

Although the present invention has been described in connection with Bluetooth networks and protocols, it will be recognized that the present invention is applicable to all types of networks and protocols. For example, the present invention can be used in any type of network in which a node participates on a time division duplex basis between more than one network.

The present invention has been described with reference to several exemplary embodiments. However, it will be readily apparent to those skilled in the art that it is possible to embody the invention in specific forms other than those of the exemplary embodiments described above. This may be done without departing from the spirit of the invention.

For example, in another embodiment, communicating in an ad hoc polling based communication infrastructure comprises defining rendezvous points for a slave node based upon information specific to the slave node, wherein the slave node simultaneously belongs to a first piconet and to a second piconet. The rendezvous points are associated with payload windows of the slave node, there being an associated payload window for each rendezvous point. The rendezvous points are monitored by a first master node of the first piconet to determine the slave node's first piconet presence for each of the associated payload windows. Also, the rendezvous points are monitored by a second master node of the second piconet to determine the slave node's second piconet presence for each of the associated payload windows.

In another alternative embodiment, communicating in an ad hoc polling based communication infrastructure comprises defining rendezvous points for a slave node based upon information specific to the slave node, wherein the slave node belongs to a first piconet. The rendezvous points are associated with payload windows of the slave node, there being an associated payload window for each rendezvous point of the slave node. The rendezvous points axe monitored by a first master node of the first piconet to determine the slave node's first piconet presence for each of the associated payload windows. The rendezvous points are for all piconets to which the slave node belongs, the first piconet being one of said all piconets.

In still another alternative embodiment, an ad hoc polling based communication system comprises a first piconet; a first node within the first piconet; and a PMP node within the first piconet, the PMP node being in communication with the first node, the PMP node having a first rendezvous point associated with a first payload window and a second rendezvous point associated with a second payload window. The ad hoc polling based communication system further comprises a second piconet; a second node within the second piconet; and a memory for storing information accessible to the first node, said information being associated with switching of the PMP node to the second piconet, and said information being stored in response to the rendezvous point.

Thus, these exemplary embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of communicating in an ad hoc polling based communication infrastructure, the method comprising steps of:
    participating by a Participant in Multiple Piconets (PMP) node in a first piconet to exchange data with a first node within a first payload window associated with a first rendezvous point;
    defining a second payload window associated with a second rendezvous point for the PMP node;
    switching the PMP node to a second piconet to exchange data with a second node within the second payload window; and
    determining by the first node, in response to the PMP node missing the second rendezvous point, said PMP node switching to the second piconet wherein:
    the first rendezvous point is defined based on information specific to the PMP node, rather than being associated with a link between the PMP node and the first node; and
    the second rendezvous point is defined based on information specific to the PMP node, rather than being associated with a link between the PMP node and the second node.

2. The method of claim 1, further comprising a step of: determining by the second node, in response to the PMP node being present at the second rendezvous point, said PMP node switching to the second piconet.

3. The method of claim 1, wherein the first node is a first master node, the second node is a second master node, and the PMP node is a slave node of the first master node and the second master node.

4. The method of claim 1, wherein the first node is a slave node, the PMP node is a first master node, and the second node is a second master node.

5. The method of claim 1, further comprising a step of: making peer nodes aware of rendezvous points associated with the PMP node, said peer nodes comprising the first node, and said rendezvous points comprising the second rendezvous point.

6. The method of claim 1, wherein the rendezvous points are based upon a unique identifying address of the PMP node.

7. The method of claim 1, further comprising a step of: generating pseudo random rendezvous points comprising the first and second rendezvous points.

8. The method of claim 7, wherein said step of generating pseudo random rendezvous points further comprises:
    using Galois fields to generate said pseudo random rendezvous points.

9. The method of claim 7, wherein said step of generating pseudo random rendezvous points further comprises:
    using a frequency hopping sequence selection algorithm to generate said pseudo random rendezvous points.

10. The method of claim 1, wherein said frequency hopping sequence is a Bluetooth frequency hopping sequence.

11. The method of claim 1, wherein said second rendezvous point is within said second payload window.

12. The method of claim 1, wherein said second rendezvous point is a predetermined number of frames prior to said second payload window.

13. The method of claim 1, further comprising a step of: setting up a long-term schedule for of rendezvous points.

14. The method of claim 1, further comprising a step of: setting up a next rendezvous point during a window in which the PMP node is present.

15. The method of claim 1, further comprising a step of:
    designating a fallback window for the PMP node in case an effort to switch to another piconet fails;
    wherein said fallback window is associated with a piconet in which the PMP node was present before the failed switch.

16. The method of claim 1, further comprising a step of:
    providing scheduling information from an interpiconet scheduler to an intrapiconet scheduler, said scheduling information comprising scheduled slave node presence or absence in the first piconet and in the second piconet.

17. The method of claim 1, wherein the ad hoc polling based communication infrastructure is a Bluetooth system.

18. A method of communicating in an ad hoc polling based communication infrastructure, the method comprising steps of:
    defining rendezvous points for a slave node based upon information specific to the slave node rather than being based on one or more links between the slave node and one or more other nodes, wherein the slave node simultaneously belongs to a first piconet and to a second piconet;
    associating the rendezvous points with payload windows of the slave node, there being an associated payload window for each rendezvous point;
    monitoring the rendezvous points by a first master node of the first piconet to determine the slave node's first piconet presence for each of the associated payload windows; and
    monitoring the rendezvous points by a second master node of the second piconet to determine the slave node's second piconet presence for each of the associated payload windows.

19. A method of communicating in an ad hoc polling based communication infrastructure, the method comprising steps of:
    defining rendezvous points for a slave node based upon information specific to the slave node rather than being based on one or more links between the slave node and one or more other nodes, wherein the slave node belongs to a first piconet;
    associating the rendezvous points with payload windows of the slave node, there being an associated payload window for each rendezvous point of the slave node; and
    monitoring the rendezvous points by a first master node of the first piconet to determine the slave node's first piconet presence for each of the associated payload windows;
    wherein said rendezvous points are for all piconets to which the slave node belongs, the first piconet being one of said all piconets.

20. The method of claim 19, wherein the slave node is a Participant in Multiple Piconets (PMP) node.

21. An ad hoc polling based communication system comprising:
- a first piconet;
- a first node within the first piconet;
- a Participant in Multiple Piconets (PMP) node within the first piconet, the PMP node being in communication with the first node, the PMP node having a first rendezvous point associated with a first payload window and a second rendezvous point associated with a second payload window;
- a second piconet;
- a second node within the second piconet;
- a memory for storing information accessible to the first node, said information being associated with switching of the PMP node to the second piconet, and said information being stored in response to the rendezvous point wherein:

the first rendezvous point is defined based on information specific to the PMP node, rather than being associated with a link between the PMP node and the first node; and the second rendezvous point is defined based on information specific to the PMP node, rather than being associated with a link between the PMP node and the second node.

22. The system of claim 21, wherein the first node is a first master node, the second node is a second master node, and the PMP node is a slave node of the first master node and the second master node.

23. The system of claim 22, wherein the first node is a slave node, the PMP node is a first master node, and the second node is a second master node.

* * * * *

UNITED STATES PATENT AND TRADEMARK OFFICE
CERTIFICATE OF CORRECTION

PATENT NO. : 7,113,536 B2 Page 1 of 1
APPLICATION NO. : 09/834911
DATED : September 26, 2006
INVENTOR(S) : Fredrik Alriksson et al.

It is certified that error appears in the above-identified patent and that said Letters Patent is hereby corrected as shown below:

Column 14, Line 51: Change "axe" to --are--

Signed and Sealed this

Thirteenth Day of March, 2007

JON W. DUDAS
*Director of the United States Patent and Trademark Office*